(12) United States Patent
Huang

(10) Patent No.: US 9,835,131 B2
(45) Date of Patent: Dec. 5, 2017

(54) POWER GENERATION DEVICE

(71) Applicant: Kuo-Chang Huang, Tainan (TW)

(72) Inventor: Kuo-Chang Huang, Tainan (TW)

(*) Notice: Subject to any disclaimer, the term of this patent is extended or adjusted under 35 U.S.C. 154(b) by 160 days.

(21) Appl. No.: 14/932,635

(22) Filed: Nov. 4, 2015

(65) Prior Publication Data
US 2016/0131104 A1 May 12, 2016

(30) Foreign Application Priority Data

Nov. 11, 2014 (TW) .............................. 103139027 A

(51) Int. Cl.
| F03B 17/06 | (2006.01) |
|---|---|
| F03D 9/00 | (2016.01) |
| F03D 13/25 | (2016.01) |
| B63B 35/44 | (2006.01) |

(52) U.S. Cl.
CPC .......... *F03B 17/062* (2013.01); *F03B 17/063* (2013.01); *F03D 9/008* (2013.01); *F03D 13/25* (2016.05); B63B 2035/4466 (2013.01); F05B 2240/216 (2013.01); F05B 2240/40 (2013.01); F05B 2240/931 (2013.01); Y02E 10/28 (2013.01); Y02E 10/38 (2013.01); Y02E 10/727 (2013.01); Y02T 70/5254 (2013.01)

(58) Field of Classification Search
CPC ......... Y02E 10/28; Y02E 10/22; F03B 17/061
USPC .................................................... 290/54, 43
See application file for complete search history.

(56) References Cited

U.S. PATENT DOCUMENTS

| 1,504,057 | A | * | 8/1924 | Koelkebeck | ............. | B63H 9/06 |
| | | | | | | 114/39.32 |
| 4,102,291 | A | * | 7/1978 | Sebald | ........................ | B63J 3/00 |
| | | | | | | 114/244 |
| 4,159,427 | A | * | 6/1979 | Wiedemann | ........... | B63H 13/00 |
| | | | | | | 290/55 |
| 4,335,093 | A | * | 6/1982 | Salomon | ................... | F03D 9/00 |
| | | | | | | 114/102.29 |
| 4,465,008 | A | * | 8/1984 | Liggett | ...................... | B63B 1/14 |
| | | | | | | 114/102.16 |
| 4,506,620 | A | * | 3/1985 | Gerr | ......................... | B63H 9/06 |
| | | | | | | 114/102.16 |
| 4,993,348 | A | * | 2/1991 | Wald | ....................... | B63B 1/107 |
| | | | | | | 114/256 |
| 5,027,735 | A | * | 7/1991 | Labrador | ............... | B01D 61/10 |
| | | | | | | 114/267 |
| 5,197,401 | A | * | 3/1993 | Finley | ...................... | B63H 9/06 |
| | | | | | | 114/102.16 |
| 7,750,491 | B2 | * | 7/2010 | Sankrithi | .............. | F03B 13/264 |
| | | | | | | 290/43 |

(Continued)

*Primary Examiner* — Tulsidas C Patel
*Assistant Examiner* — Charles Reid, Jr.
(74) *Attorney, Agent, or Firm* — LeClairRyan

(57) ABSTRACT

A power generation device is adapted to be driven by ocean currents, and includes a craft body unit, a plurality of blade units, a plurality of power generators, and a plurality of sails. The blade units are mounted on the craft body unit, and are adapted to extend into the sea and to be driven rotatably by the ocean currents. The power generators are mounted on the craft body unit and connected respectively to the blade units for converting a kinetic energy of the blade units into electrical energy. The sails are mounted on the craft body unit for capturing the wind to maintain a location of the craft body unit against drifting from a force of the ocean currents applied to the craft body unit.

3 Claims, 7 Drawing Sheets

(56) References Cited

U.S. PATENT DOCUMENTS

| | | | | |
|---|---|---|---|---|
| 7,948,101 B2* | 5/2011 | Burtch | ................. | C25B 1/04 |
| | | | | 290/43 |
| 8,102,070 B2* | 1/2012 | Terao | ................. | B60L 8/00 |
| | | | | 290/54 |
| 8,373,297 B2* | 2/2013 | Grigg | ................. | F03D 3/002 |
| | | | | 290/43 |
| D718,208 S * | 11/2014 | Smyth | ................. | D12/303 |
| 2005/0236841 A1* | 10/2005 | Henriksen | ............ | B63B 35/44 |
| | | | | 290/54 |
| 2005/0252764 A1* | 11/2005 | Meller | ................. | B63B 35/44 |
| | | | | 204/242 |
| 2007/0120371 A1* | 5/2007 | Gehring | ............ | F03B 17/061 |
| | | | | 290/54 |
| 2008/0303284 A1* | 12/2008 | Clemens | ............ | F03B 17/066 |
| | | | | 290/54 |
| 2009/0236855 A1* | 9/2009 | Jordan | ................. | F03B 17/063 |
| | | | | 290/54 |
| 2010/0237625 A1* | 9/2010 | Dempster | ............ | F03B 7/00 |
| | | | | 290/54 |
| 2011/0101697 A1* | 5/2011 | Power, III | ............ | B63B 35/44 |
| | | | | 290/54 |
| 2012/0292911 A1* | 11/2012 | Bolin | ................. | F03B 17/061 |
| | | | | 290/54 |
| 2015/0048619 A1* | 2/2015 | Lin | ................. | F03B 13/264 |
| | | | | 290/54 |

* cited by examiner

POWER GENERATION DEVICE

CROSS-REFERENCE TO RELATED APPLICATION

This application claims priority of Taiwanese Application No. 103139027, filed on Nov. 11, 2014.

FIELD

The disclosure relates to a power generation device, more particularly to a power generation device adapted to be operated on the sea and driven by an ocean current.

BACKGROUND

Generally, an ocean current flows at a location far away from the seashore, so that a power generation device which is driven by the ocean current cannot be directly connected to the seashore. Anchoring such power generation device is difficult since a seabed region underneath the ocean current is generally thousands of meters deep due to long-term erosion, and since a strong force is generally applied by the ocean current against the power generation device.

SUMMARY

Therefore, the object of the disclosure is to provide a power generation device adapted to be driven by ocean currents and reliably operated at a desired region in the ocean.

Accordingly, a power generation device of the present disclosure includes a craft body unit, a plurality of blade units, a plurality of power generators, and a plurality of sails. The blade units are mounted on the craft body unit, and are adapted to extend into the sea and to be driven rotatably by the ocean currents. The power generators are mounted on the craft body unit and connected respectively to the blade units for converting a kinetic energy of the blade units into electrical energy. The sails are mounted on the craft body unit for capturing the wind to maintain a location of the craft body unit against drifting from a force of the ocean currents applied to the craft body unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
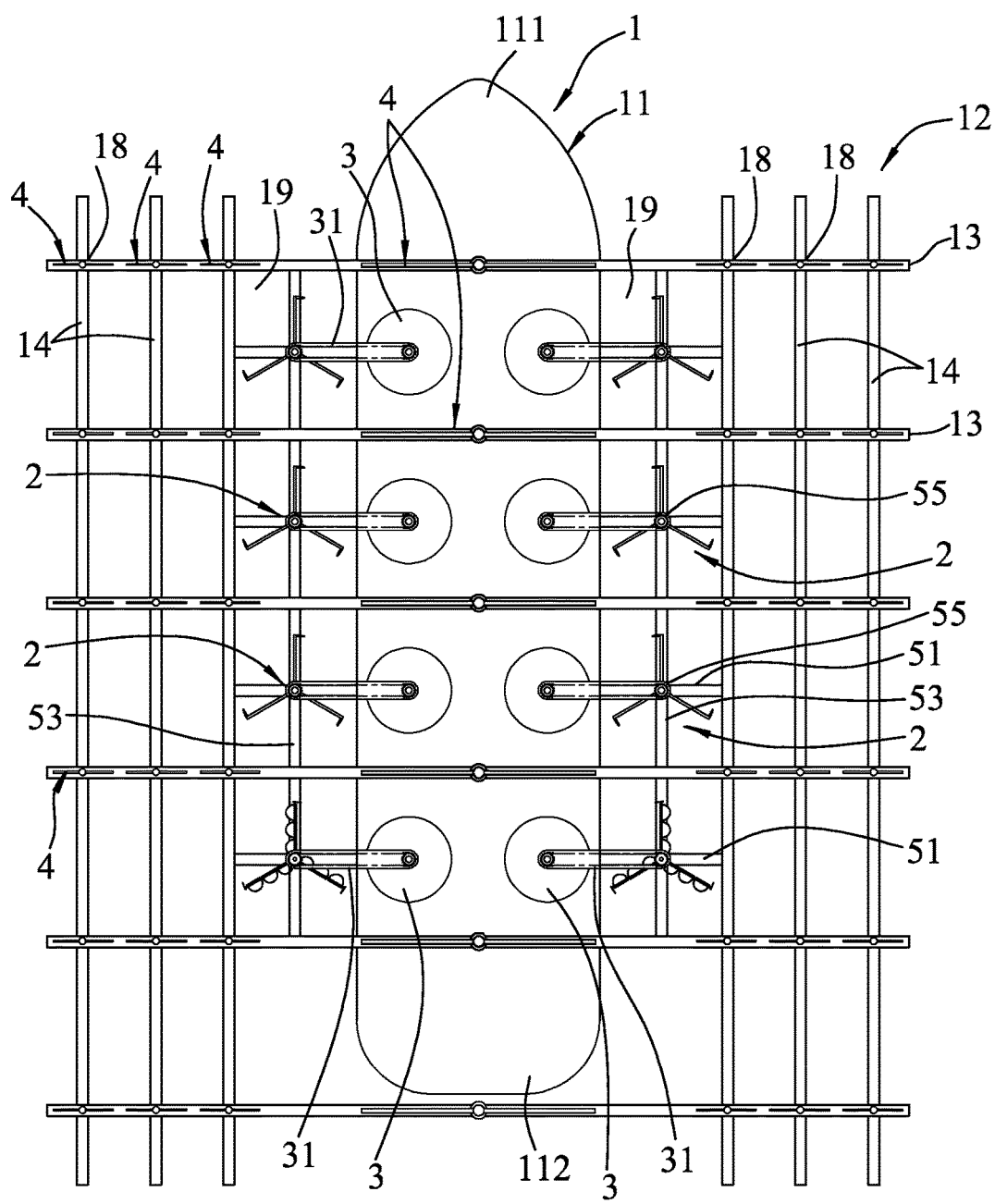
FIG. 1 is a top view of a first embodiment of a power generation device according to the disclosure.
Figure 2:
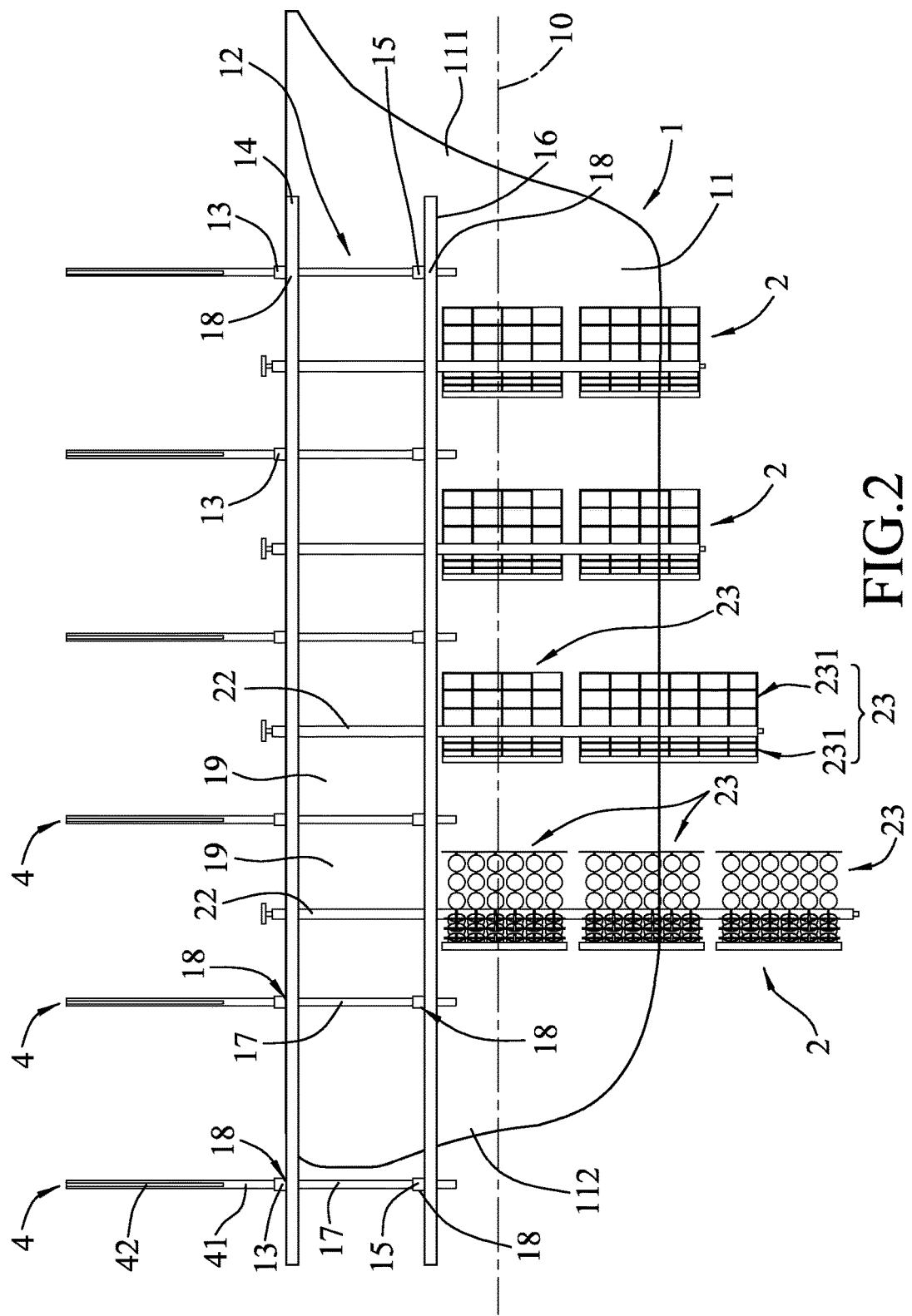
FIG. 2 is a side view of the first embodiment.

Before the pre sent disclosure is described in greater detail, it should be noted that like elements are denoted by the same reference numerals throughout the disclosure.

As shown in FIGS. 1 to 4, a first embodiment of a power generation device according to the present disclosure is adapted to be driven by an ocean current, and includes a craft body unit 1, a plurality of blade units 2, a plurality of power generators 3, and a plurality of sails 4.

The craft body unit 1 includes a craft body 11, and a frame body 12 mounted on the craft body 11. The craft body 11 has a bow 111 at a front side of the craft body 11, and a stern 112 at a rear side of the craft body 11. A decommissioned business craft, fishing craft, speedboat, or sailboat may be used as the craft body 11 for the purpose of environmental protection.

The frame body 12 includes a plurality of first upper rods 13, a plurality of first lower rods 15, a plurality of second upper rods 14, a plurality of second lower rods 16, and a plurality of connecting rods 17.

The first upper rods 13 are connected to the craft body 11, extend in a left-right direction, and are spaced apart from each other in a front-rear direction which is perpendicular to the left-right direction. The first lower rods 15 are connected to the craft body 11 and extend in the left-right direction. Each of the first lower rods 15 is disposed under a respective one of the first upper rods 13. The second upper rods 14 extend in the front-rear direction, are spaced apart from each other in the left-right direction, and intersect the first upper rods 13. The second lower rods 16 extend in the left-right direction, disposed respectively under the second upper rods 14, and intersect the first lower rods 15.

Each of intersections between the first upper rods 13 and the second upper rods 14, and between the first lower rods 15 and the second lower rods 16 is defined as a first installation portion 18. The arrangement of the first lower rods 15 and the second lower rods 16 is the same as the arrangement of the first upper rods 13 and the second upper rods 14. As such, the first upper rods 13 and the second upper rods 14 form a grid structure, and the first lower rods 15 and the second lower rods 16 form another grid structure.

The connecting rods 17 extend vertically, and interconnect the grid structure of the first upper rods 13 and the second upper rods 14 and the grid structure of the first lower rods 15 and the second lower rods 16. With the connecting rods 17, the number of which may be increased depending on practical requirements, the structure of the frame body 12 is more stable.

Referring to FIGS. 1, 2, 4 and 5, the first upper rods 13, the second upper rods 14, the first lower rods 15, and the second lower rods 16 cooperatively define a plurality of installation spaces 19 located at left and right sides of the craft body 11. The frame body further includes a plurality of first upper installation rods 51, a plurality of first lower installation rods 52 (only one is visible in FIG. 4), two second upper installation rods 53, and two second lower installation rods 54. The first upper installation rods 51 are disposed respectively in the installation spaces 19, and extend in the left-right direction. The first lower installation rods 52 extend in the left-right direction, and each of the first lower installation rods 52 is disposed under a respective one of the first upper installation rods 51. The second upper installation rods 53 are spaced apart from each other in the left-right direction, extend in the front-rear direction, and intersect the first upper installation rods 51. The second lower installation rods 54 extend in the front-rear direction and intersect the first lower installation rods 52. Each of the second lower installation rods 54 is disposed under a respective one of the second upper installation rods 53. In this embodiment, the number of both the first upper installation rods 51 and the first lower installation rods 52 is eight. The first upper installation rods 51 are equally divided into two groups disposed respectively at opposite left and right sides of the craft body 11. Each of the second upper installation rods 53 intersects a respective one of the groups of the first upper installation rods 51 (i.e., four of the first upper installation rods 51). The first lower installation rods 52 and the second lower installation rods 54 are arranged in the same manner. Each of intersections between the first upper installation rods 51 and the second upper installation rods 53, and between the first lower installation rods 52 and the second lower installation rods 54, is defined as a second installation portion 55. The first and second upper installation rods 51, 53 are connected firmly to the first and second upper rods 13, 14. The first and second lower installation rods 52, 54 are connected firmly to the first and second lower rods 15, 16.

The blade units 2 are mounted on the craft body unit 1, and are adapted to extend into the sea through a sea surface 10 and to be driven rotatably by the ocean current. Specifically, the blade units 2 are mounted on the frame body 12 and are disposed at opposite lateral sides of the craft body 1. In this embodiment, the number of the blade units 2 is eight. The blade units 2 are equally divided into two groups disposed respectively at opposite left and right sides of the craft body 11. Each group includes four of the blade units 2 spaced apart from one another in the front-rear direction. The blade units 2 are respectively disposed in the installation spaces 19. Each of the blade units 2 includes two bearings 21 (only one is visible in FIG. 5) spaced apart from each other in a vertical direction perpendicular to the left-right direction and the front-rear direction, and disposed respectively at two of the second installation portions 55 which are registered in the vertical direction. In this embodiment, each of the blade units 2 further includes a rotary shaft 22 that extends rotatably and vertically through the two bearings 21, and a plurality of blade modules 23 spaced apart from each other in the vertical direction and connected co-rotatably to the rotary shaft 22. In this embodiment, each blade module 23 includes three blade assemblies 231.

The design of each of the blade modules 23 may be the same as that disclosed in Taiwanese Utility Model Patent No. M485960 or Taiwanese Utility Model Patent No. M489201. In this embodiment, for example, each of the blade assemblies 231 of the rearmost pair of the blade units 2 includes a grid frame and a plurality of cup members, while each of the blade assemblies 231 of the remainder of the blade units 2 includes a grid frame and a plurality of swingable vanes. Since the feature of this invention does not reside in the structure of the blade assemblies 231, details of the same are omitted herein for the sake of brevity. The structure of each blade assembly 231 may vary in other embodiments as long as the blade units 2 can be rotated by the ocean current.

In use, the craft body 11 is oriented with the bow 111 pointing against the direction of flow of the ocean current, and the length of the rotary shafts 22 of the blade unit 2 increases in the front-rear direction from the bow 111 toward the stern 112 in order to increase the volume of the blade modules 23 subjected to the pushing force of the ocean current, thereby maintaining the orientation of the craft body 11.

The power generators 3 are mounted on the craft body 11 and connected respectively to the blade units 2 for converting a kinetic energy of the blade units 2 into electrical energy. In this embodiment, the number of the power generators 3 is eight, and each of the power generators 3 has a shaft core connected to the rotary shaft 22 of a respective one of the blade units 2 via a transmission unit 31. Each of the transmission units 31 may be configured as, for example, a combination of a chain trained on gears, or a combination of a belt trained on pulleys. As such, each of the rotary shafts is rotated by a total torque exerted on the corresponding blade modules 23, and rotary of the rotary shafts 22 drives operations of the power generators 3.

Figure 3:
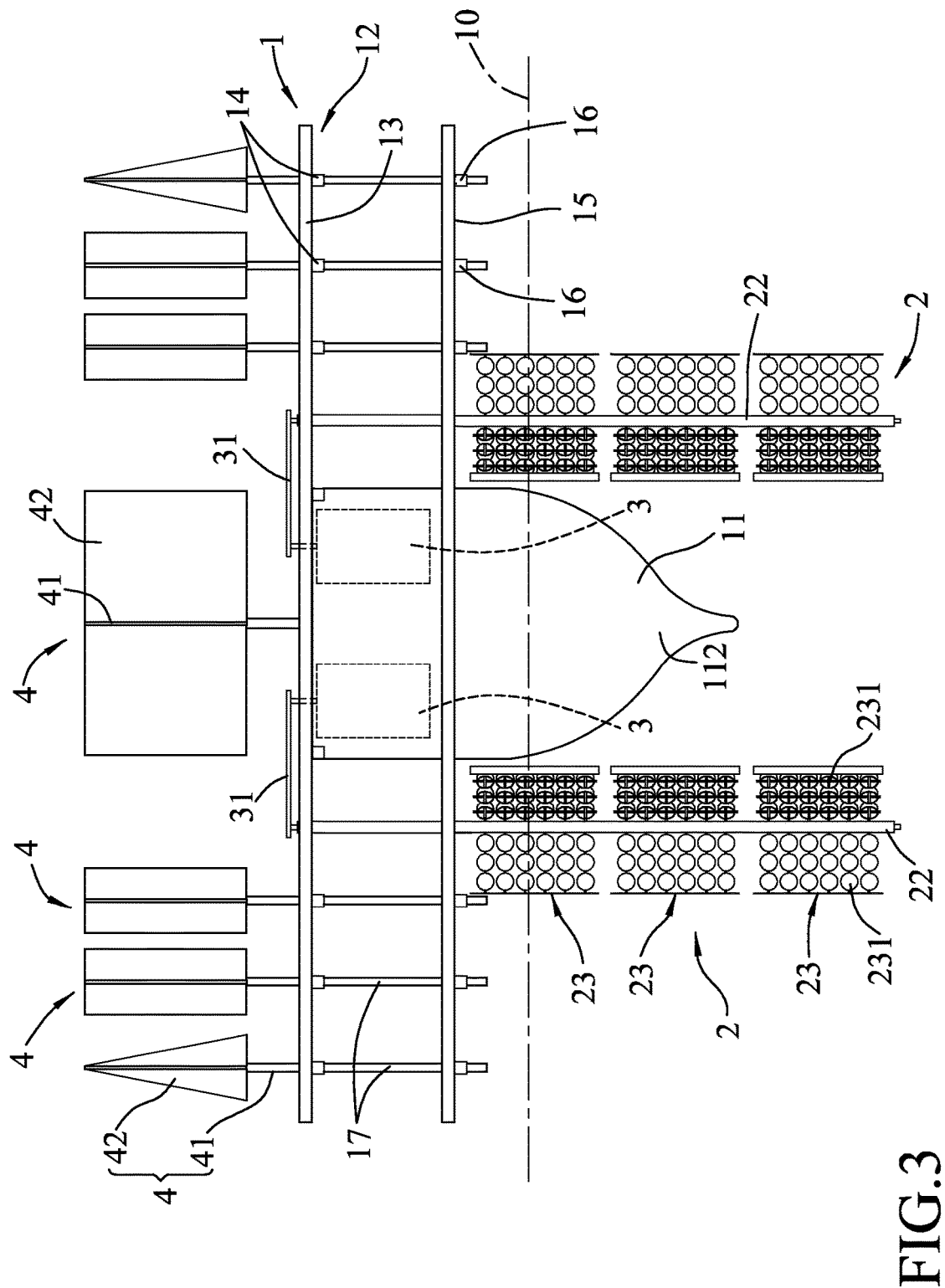
FIG. 3 is a rear view of the first embodiment.
Figure 4:
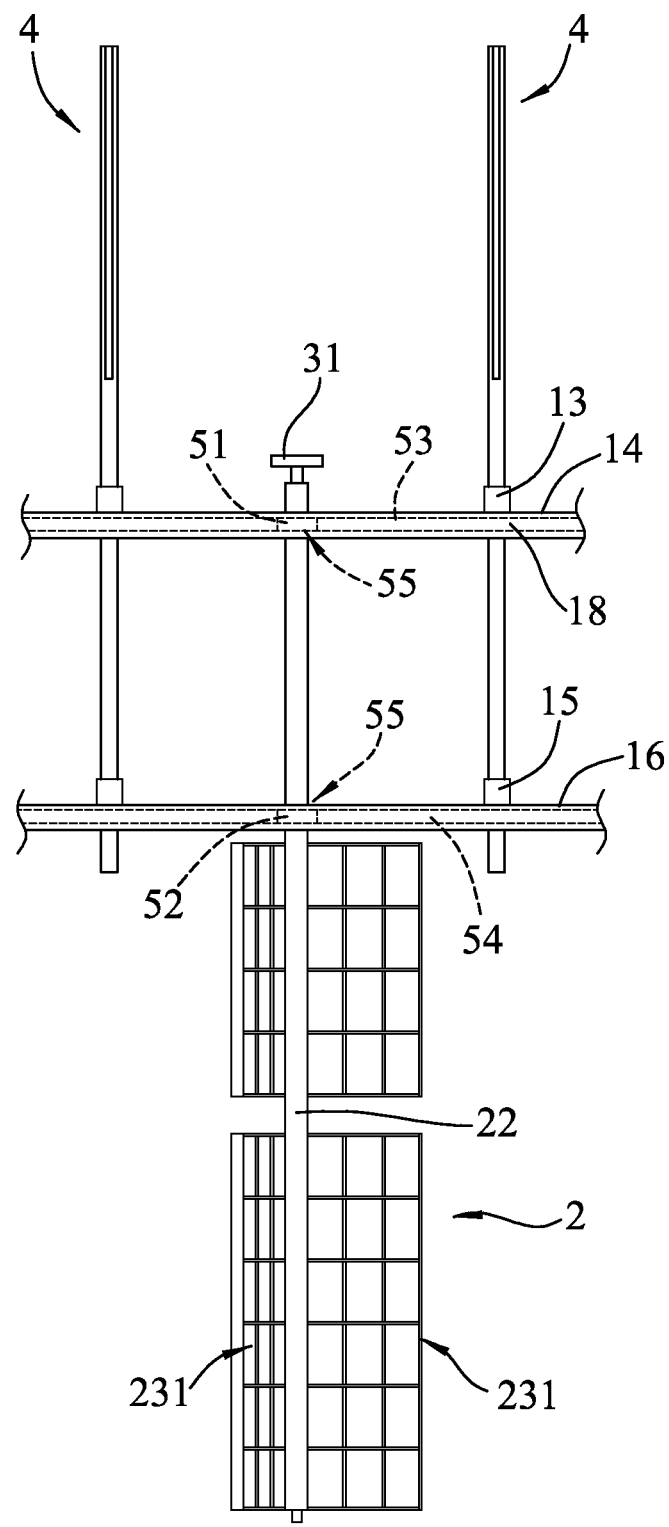
FIG. 4 is an enlarged fragmentary side view of the first embodiment.
Figure 5:
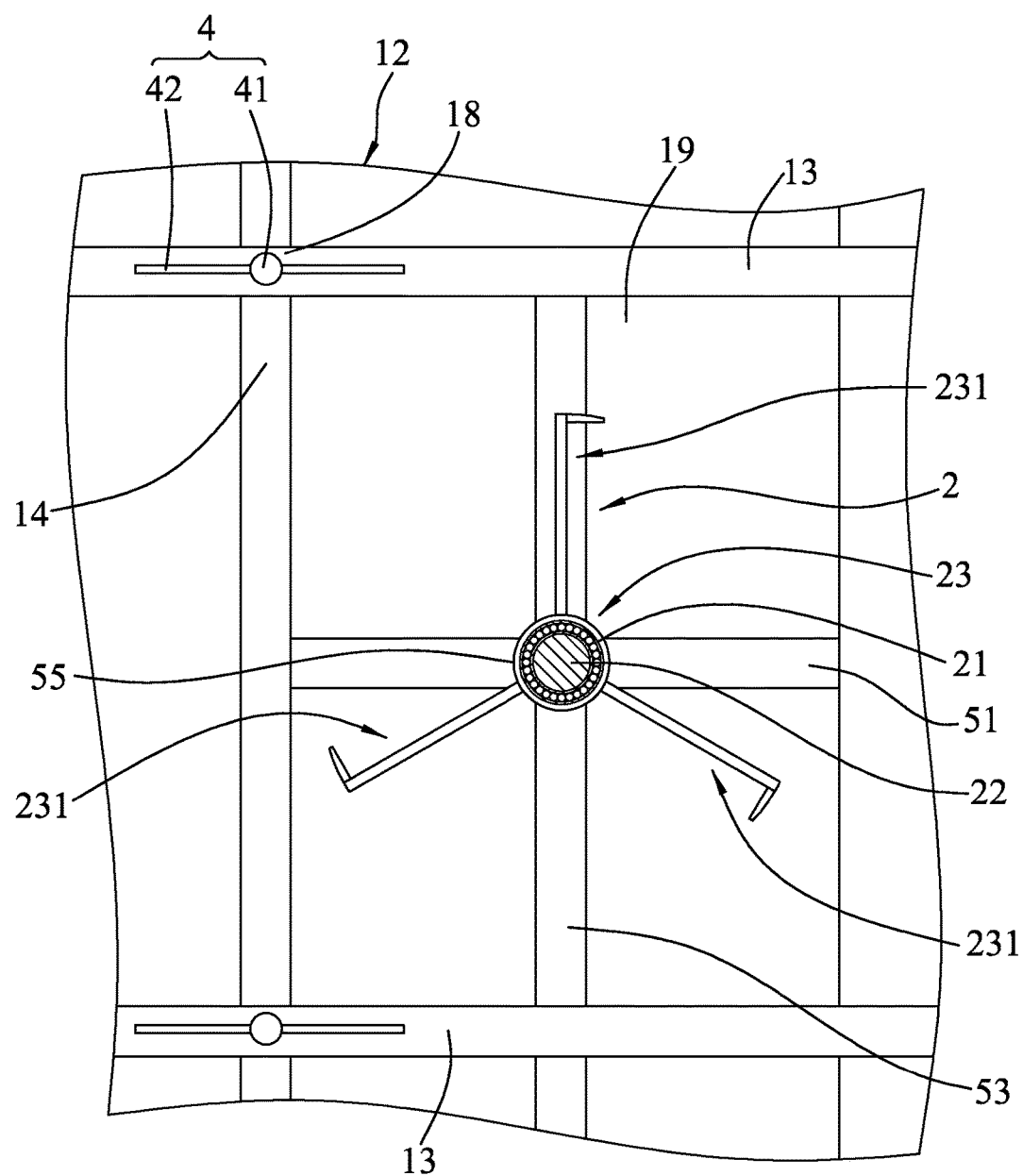
FIG. 5 is an enlarged fragmentary top view of the first embodiment.

The sails 4 are mounted on the frame body 12 for capturing the wind to maintain a location of the craft body unit 1 against drifting from a force applied by the ocean current to the craft body unit 1. In this embodiment, some of the sails 4 are spaced apart from each other in the front-rear direction and disposed over the craft body 11, and the remainder of the sails 4 are disposed at opposite lateral sides of the craft body 11. In this embodiment, each one of the sails 4 has a sail pole 41 that is connected to a respective one of the first installation portions 18 and a respective one of the connecting rods 17 of the frame body 12 and that extends upwardly, and a sailcloth 42 that is disposed on the sail pole 41. The sail pole 41 of each of the sails 4 and the respective one of the connecting rods 17 may be formed as one piece or may be two different rods connected together. In this embodiment, when the sails 4 are blown, each of the sailcloths 42 is in a curved shape. Based on the Bernoulli's principle, the wind that flows over the convex surface of each sailcloth 42 is faster than the wind that flows over the concave surface (which is opposite to the convex surface) of the sailcloth 42, and the pressure at the two sides of each sailcloth is also different, so that the craft body 11 floats at slow speed. Referring to FIG. 3, the sailcloths 42 of leftmost and rightmost ones of the sails 4 is triangular when being blown with a width thereof increasing vertically from a top to a bottom thereof, thereby further stabilizing the orientation of the craft body 11. It should be noted that the sailcloths 42 may be trapezoid or other shapes in other embodiments.

In operation, the power generation device is generally set up at a place where the direction of the ocean current is opposite to the seasonal wind direction. For example, the craft body 11 can be oriented to head against the direction of flow of the ocean current so that when the wind blows from the stern 112 of the craft body 11 to the bow 111 of the craft body 11, the sails 4 can capture the wind and the power generation device can receive a forward force against the force exerted by the ocean current for stabilization of the craft body. Therefore, the power generation device can remain steadily within a desired area of the ocean. Even if the resultant force applied on the power generation device (particularly the wind force and the ocean current force) is not zero, the power generation device would still only drift on the sea surface 10 at an extremely slow speed by virtue of the configuration of the blade units 2 and the sails 4, so that the power generation device can be maintained within the desired area of the ocean. In addition, orientation of the sailcloths 42 may be adjusted, according to current directions of the wind and ocean current, by a crew of the power generation device to cause the power generation device to drift back to the original position. Moreover, the craft body 11 may be equipped with a propeller (not shown) powered by the electrical energy of the power generators 3 to control the orientation of the craft body 11.

It should be further noted that, for each of the blade units 2, the blade modules 23 may be individually detachable from the rotary shaft 22. A hoist (not shown) may be installed on the craft body 11 for hoisting the blade modules 23 and setting the blade modules 23 on the craft body 11 to prevent the gravity center of the craft body 11 from being affected by the total wind force that the sails 4 are subjected to and the length of the rotary shafts 22 of the blade units 2 extending into the sea, which would otherwise cause the craft body 11 to capsize. The abovementioned procedure can balance the wind force and the ocean current force applied to the power generation device to stabilize the craft body 11. Furthermore, in this embodiment, each of the bearings 21 is a ball bearing, and the number of the bearings 21 disposed in each blade unit 2 may be more than two in other embodiments. When the power generation device is installed at a location where the seabed is situated at a shallow depth, an anchor may be used to help the positioning of the power generation device. If the power generation device is installed at a location not too far away from the seashore, it may be directly secured to the seashore with a cable connected therebetween.

Figure 6:
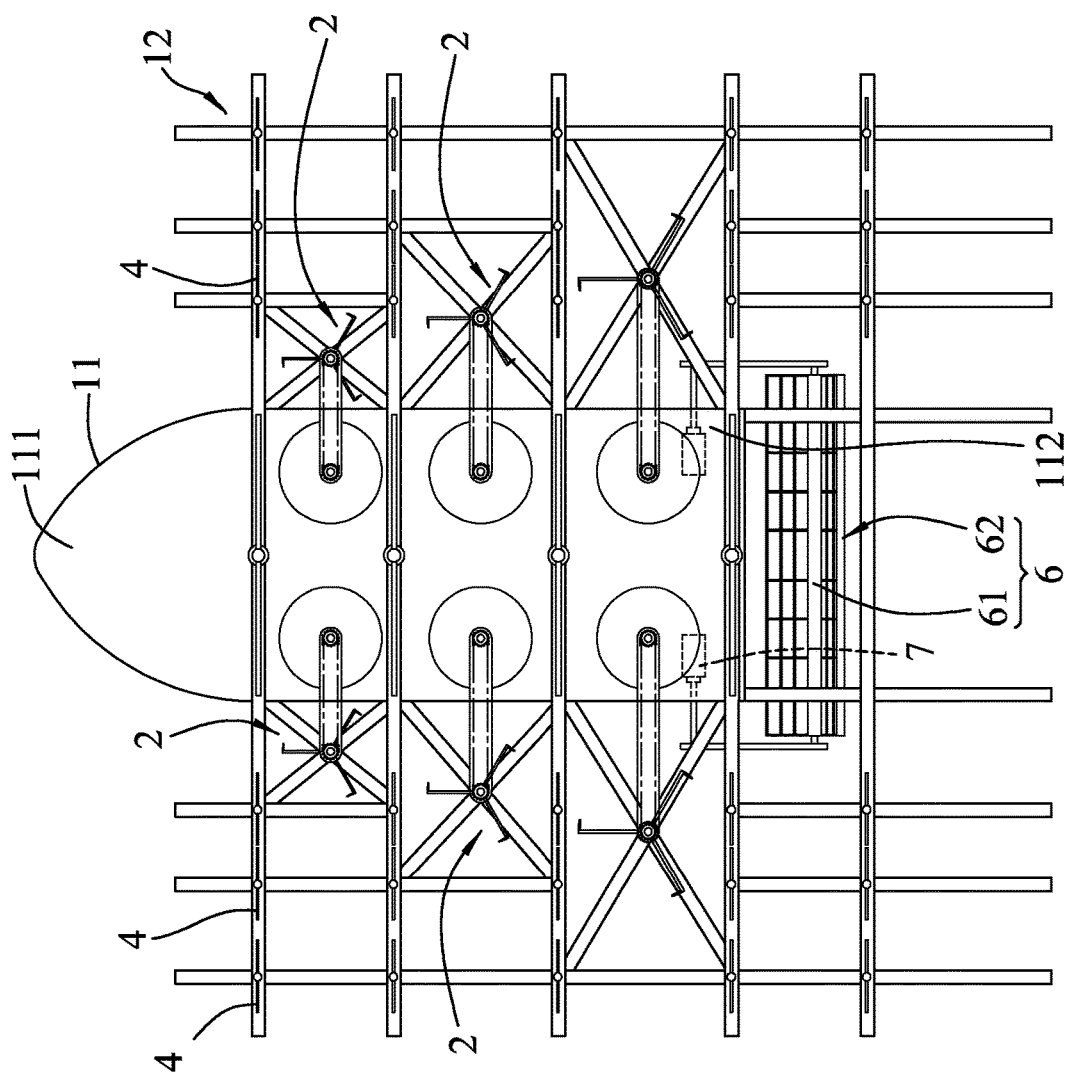
FIG. 6 is a top view of a second embodiment of the power generation device according to the disclosure.

As shown in FIG. 6, the second embodiment has a structure similar to that of the first embodiment. The main difference between this embodiment and the previous embodiment resides in the number of the blade units 2 and the configuration of the frame body 12. In this embodiment, the number of the blade units 2 is six, and the blade units 2 are equally divided into two groups and disposed respectively at opposite lateral sides of the craft body 11. Among the three blade units 2 which are in the same group, the size of the blade units 2 increases in the front-rear direction from the bow 111 to the stern 112 of the craft body 11. In such manner, when the ocean current flows from the bow 111 of the craft body 11 to the stern 112 of the craft body 11, the blade units 2 are easily driven thereby. In addition, the orientation of the craft body 11 can be maintained stably. Furthermore, instead of being grid structures, the frame body 12 used to be mounted with the blade units 2 in this embodiment includes a plurality of X-shaped rod structures. The structure of the frame body 12 is not limited, and may vary in other embodiments. This embodiment further includes an ancillary blade unit 6 and an ancillary power generator 7 connected to the ancillary blade unit 6. The ancillary blade unit 6 is mounted at the stern 112 of the craft body 11 and connected to the frame body 12, and includes an ancillary rotary shaft 61 that extends rotatably in the left-right direction, and an ancillary blade module 62 connected co-rotatably to the ancillary rotary shaft 61. The disposition of the ancillary blade unit 6 and the ancillary power generator 7 is for increasing the use efficiency of the ocean current and the power generation efficiency, and the transverse disposition of the blade unit 6 is for stabilizing the orientation of the bow 111 of the craft body 11.

Figure 7:
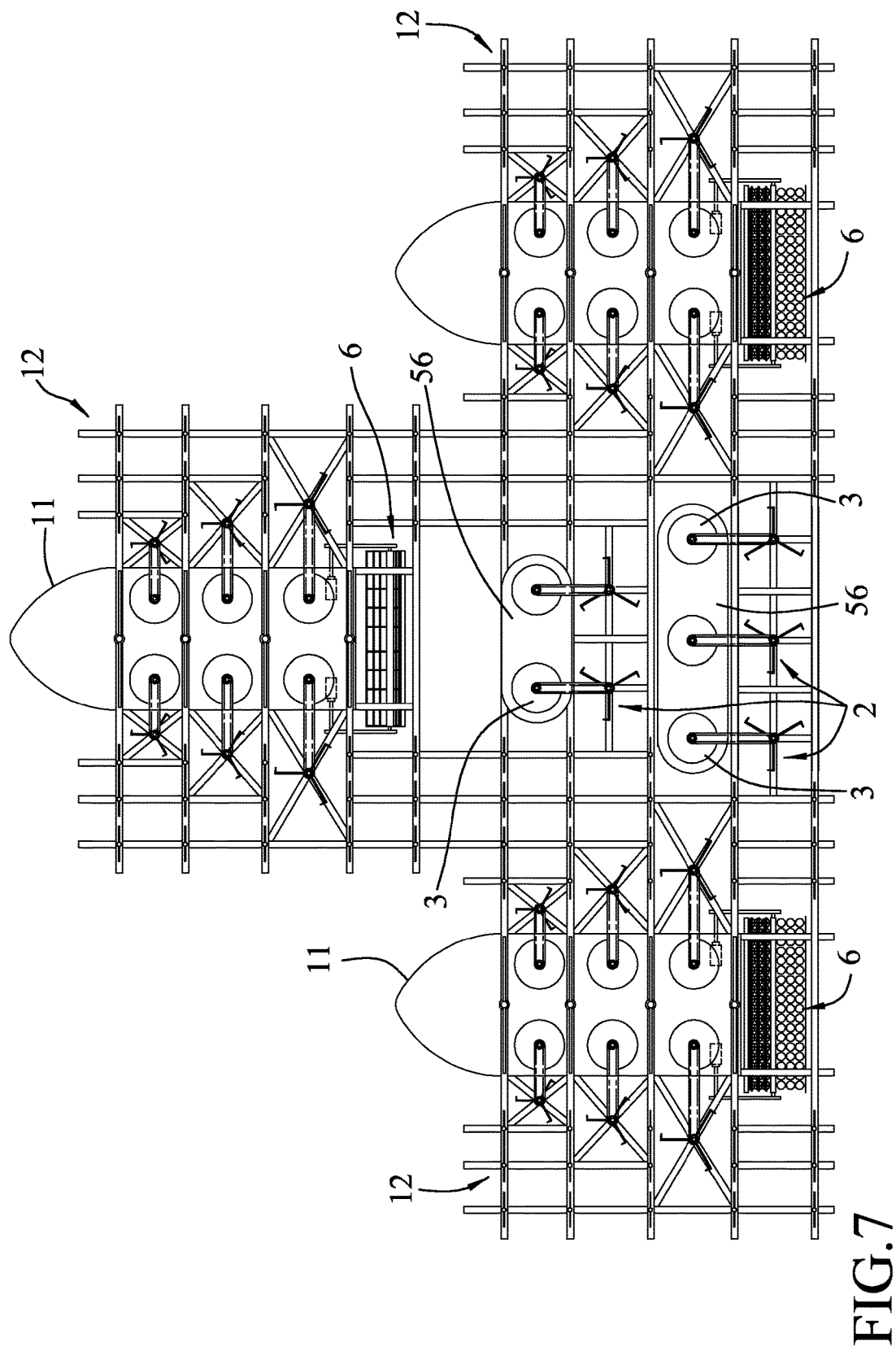
FIG. 7 is a top view illustrating a plurality of the second embodiments being connected together.

A combination of the power generation device may be applied. FIG. 7 illustrates, for example, the frame bodies 12 of three of the power generation devices disclosed in the second embodiment being connected together. Two platforms 56 are disposed at a rear side of the combination and are spaced apart from each other in the front-rear direction, and additional blade units 2 and power generators 3 are mounted on the platforms 56 to raise the use efficiency of the ocean current and the power generation efficiency. The number of the power generation device to form the combination may be two, four or five, and such combination would contribute to the stabilization of the craft bodies 11. The structure of the ancillary blade unit 6 which is connected to the frontmost one of the power generation devices may adopt the design of swingable vanes, and the structure of the two ancillary blade units 6 which are connected to the two rear ones of the power generation devices may adopt the design of cup members. It should be noted that, each of the power generation devices in the combination may employ the structure illustrated in the first embodiment.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A power generation device adapted to be driven by an ocean current, comprising:
    a craft body unit;
    a plurality of blade units mounted on said craft body unit, and adapted to extend into the sea and to be driven rotatably by the ocean current;
    a plurality of power generators mounted on said craft body unit and connected respectively to said blade units for converting a kinetic energy of said blade units into electrical energy; and
    a plurality of sails mounted on said craft body unit for being blown by the wind to maintain a location of said craft body unit against drifting from a force of the ocean current applied to said craft body unit;
    wherein said craft body unit includes a craft body and a frame body mounted on said craft body, said blade units being mounted on said frame body and disposed at opposite lateral sides of said craft body, said sails being mounted on said frame body, at least two of said sails being disposed respectively at opposite lateral sides of said craft body;
    wherein each of said blade units includes a rotary shaft extending rotatably and vertically, and at least one blade module connected co-rotatably to said rotary shaft;
    wherein said frame body includes
        a plurality of first upper rods connected to said craft body, extending in a left-right direction, and spaced apart from each other in a front-rear direction,
        a plurality of first lower rods connected to said craft body and extending in the left-right direction,
        a plurality of second upper rods extending in the front-rear direction, spaced apart from each other in the left-right direction, and intersecting said first upper rods,
        a plurality of second lower rods intersecting said first lower rods, and
    a plurality of connecting rods extending vertically, interconnecting said first upper rods and said first lower rods, and interconnecting said second upper rods and said second lower rods, each of said first lower rods being disposed under a respective one of said first upper rods; and
    wherein
        said first upper rods, said second upper rods, said first lower rods, and said second lower rods cooperatively define a plurality of installation spaces located at left and right side of said craft body,
        said frame body further including
            a plurality of first upper installation rods that are disposed respectively in said installation spaces, and that extend in the left-right direction,
            a plurality of first lower installation rods that extend in the left-right direction,
            two second upper installation rods that are spaced apart from each other in the left-right direction, that extend in the front-rear direction, and that intersect said first upper installation rods, and two second lower installation rods that extend in the front-rear direction and intersect said first lower installation rods, each of said second lower installation rods being disposed under a respective one of said second upper installation rods, each of said first lower installation rods being disposed under a respective one of said first upper installation rods, and said rotary shaft of each of said blade units extending rotatably through an intersection between a respective one of said first upper installation rods and a corresponding one of said second upper installation rods, and an intersection between a respective one of said first lower installation rods and a corresponding one of said second lower installation rods.

2. The power generation device as claimed in claim 1, wherein each one of said sails has a sail pole that is connected to one of said connecting rods of said frame body and that extends upwardly, and a sailcloth that is disposed on said sail pole.

3. The power generation device as claimed in claim 1, further comprising an ancillary blade unit mounted at a rear side of said craft body and connected to said frame body, said ancillary blade unit including an ancillary rotary shaft that extends rotatably in the left-right direction, and an ancillary blade module connected co-rotatably to said ancillary rotary shaft.

* * * * *